United States Patent
Gray

(10) Patent No.: US 10,662,991 B2
(45) Date of Patent: May 26, 2020

(54) FASTENER

(71) Applicant: GRAYS CLIP LIMITED, Lisburn (GB)

(72) Inventor: David Gray, Lisburn (GB)

(73) Assignee: Gray's Clips Limited, Lisburn (GB)

( * ) Notice: Subject to any disclaimer, the term of this patent is extended or adjusted under 35 U.S.C. 154(b) by 88 days.

(21) Appl. No.: 15/579,783

(22) PCT Filed: Jun. 3, 2016

(86) PCT No.: PCT/GB2016/051642
§ 371 (c)(1),
(2) Date: Dec. 5, 2017

(87) PCT Pub. No.: WO2016/193747
PCT Pub. Date: Dec. 8, 2016

(65) Prior Publication Data
US 2018/0172052 A1    Jun. 21, 2018

(30) Foreign Application Priority Data

Jun. 5, 2015 (GB) .................................. 1509818.9

(51) Int. Cl.
*F16B 15/00*    (2006.01)
*F16B 15/08*    (2006.01)
(Continued)

(52) U.S. Cl.
CPC ............... *F16B 15/08* (2013.01); *F16L 3/04* (2013.01); *H02G 3/30* (2013.01); *F16B 5/0685* (2013.01)

(58) Field of Classification Search
USPC ....................................................... 411/469
See application file for complete search history.

(56) References Cited

U.S. PATENT DOCUMENTS 2,510,693 A    6/1950   Green
3,348,669 A    10/1967  Powers
(Continued)

FOREIGN PATENT DOCUMENTS

CN    104518472    4/2015
DE    102013001145    7/2014
(Continued)

OTHER PUBLICATIONS http://www-materials.eng.cam.ac.uk/mpsite/interactive_charts/resistivity-cost/NS6Chart.html.
(Continued)

*Primary Examiner* — Gary W Estremsky
(74) *Attorney, Agent, or Firm* — Sullivan & Worcester LLP

(57) ABSTRACT

A fastener for fastening an elongate object to a support structure, the fastener comprising a body portion formed entirely of one or more electrically non-conductive materials and comprising a bridge, a first column extending substantially perpendicularly from a first end of the bridge and a second column extending substantially perpendicularly from a second end of the bridge, the bridge and columns together forming a U-shaped receptacle for engaging the elongate object, and a nail formed entirely of one or more electrically non-conductive materials and partially contained within the first column of the body portion for positively engaging with the support structure upon the application of force by a driving mechanism thereby fastening the elongate object to the support structure.

19 Claims, 6 Drawing Sheets

(51) Int. Cl.
*F16L 3/04* (2006.01)
*H02G 3/30* (2006.01)
*F16B 5/06* (2006.01)

(56) References Cited

U.S. PATENT DOCUMENTS

| | | | | |
|---|---|---|---|---|
| 3,915,299 A * | 10/1975 | Miyaoku | ............... | F16B 15/08 206/345 |
| 4,801,064 A * | 1/1989 | Mangone, Jr. | ............ | F16L 3/04 227/120 |
| 5,201,484 A * | 4/1993 | Thoen | .................. | F16L 3/2235 248/68.1 |
| 5,223,675 A * | 6/1993 | Taft | ......................... | H02G 3/26 174/159 |
| 5,547,325 A * | 8/1996 | Tucker | .................... | B29C 70/12 206/345 |
| 5,795,121 A | 8/1998 | Tucker | | |
| 6,168,362 B1 | 1/2001 | Tucker et al. | | |
| 6,378,813 B1 * | 4/2002 | Gretz | ........................ | F16L 3/04 248/68.1 |
| 6,489,569 B1 * | 12/2002 | Thomson | ............ | H01B 17/145 174/154 |
| 6,530,803 B1 * | 3/2003 | Chen | ................. | H01R 13/5837 174/159 |
| 7,546,988 B1 * | 6/2009 | Schecter | ................... | F16L 3/04 248/65 |
| 7,617,883 B1 * | 11/2009 | Mangone, Jr. | .......... | F16B 15/08 173/1 |
| 2003/0089829 A1 | 5/2003 | Brandzel et al. | | |

FOREIGN PATENT DOCUMENTS

| | | |
|---|---|---|
| DE | 102013001145 A1 | 7/2014 |
| GB | 1448759 | 3/1974 |
| JP | S6383922 U | 6/1988 |

OTHER PUBLICATIONS http://www-materials.eng.cam.ac.uk/mpsite/interactive_charts/strength-toughness/basic.html.
Examination Report from Australian application 2016272544 dated Sep. 3, 2019.
Examination Report from Canadian application 2986662 dated Dec. 3, 2019.
Examination Report from Chinese application 201680032011.5 dated Oct. 11, 2019.
Examination Report from European application 16736552.7 dated Oct. 18, 2019.
International Search Report for PCT/GB2016/051642 filed Jun. 3, 2016.
Canadian Examination report for 2986662 dated Oct. 4, 2018.
Canadian Examination report for 2986662 dated Apr. 2, 2019.
Chinese Examination report for 201680032011.5 dated Apr. 2, 2019 (English translation).
UK Examination report for GB1609724.8 dated Jul. 22, 2016.

* cited by examiner

Detail A

FASTENER

This application is a national stage of International Application No. PCT/GB2016/051642, filed Jun. 3, 2016, which claims priority to GB Patent Application No. 1509818.9, filed Jun. 5, 2015, the entire disclosures of which are herein expressly incorporated by reference.

The present invention relates to a fastener and in particular to fasteners for attaching electrical and other types of cabling.

Fasteners such as staples and clips are commonly used in the construction industry as a simple and effective method to attach electrical and other types of cables to a support structure, such as wood, and comprise metallic structural components, which conduct electricity. However, the attachment process has inherent dangers. The most significant danger is that the insulating sheath of an electrical cable to be attached to the support structure is penetrated or sliced open during the process, exposing live wires. This is not only immediately dangerous to the installer of the electrical cable, due to the conductive, metallic components of the staple being used, but would also present a fire and electrical hazard subsequent to installation.

For the purposes of fastening 220/240 V AC electrical cables to wooden structural supports, it is conventional practice to utilise a clip with associated metal nail; whereby each individual clip is placed over the cable while the nail is manually hammered into the wooden structure to fasten the clip and embraced cable into place. The repeated hammering of the nails into position to mount the length of cable can be a tiresome and time-consuming task for an installer. As a manual hammer has no torque setting, the possibility exists of over-hammering the nail, thereby damaging the cable.

It is an object of the present invention to provide a novel and improved fastener reducing the risk of electrical current leakage or exposure whilst capable of being delivered with a fastener gun.

According to a first aspect of the present invention there is provided a fastener for fastening an elongate object to a support structure, the fastener comprising:

a body portion formed entirely of one or more electrically non-conductive materials and comprising a bridge, a first column extending substantially perpendicularly from a first end of the bridge and a second column extending substantially perpendicularly from a second end of the bridge, the bridge and columns together forming a U-shaped receptacle for engaging the elongate object, and a nail formed entirely of one or more electrically non-conductive materials and partially contained within the first column of the body portion for positively engaging with the support structure upon the application of force by a driving mechanism thereby fastening the elongate object to the support structure.

The first column may comprise a bore which partially contains the first nail within the first column of the body portion. The bore may wholly extend through the first column. The bore may partially extend through the first column.

The bore of the first column may contain a portion of the first nail adjacent an end of the nail for engaging with the support structure. The bore of the first column may form an interference fit with the portion of the first nail. The bore of the first column may be attached to the portion of the first nail. The bore of the first column may have a diameter which facilitates movement of the first nail along the bore to allow the portion of the nail to protrude from the bore. The first nail may thus be displaceable relative to the body portion, from an out-of-use non-fastening configuration to an in-use fastening configuration, for fastening the fastener to the support structure upon the application of force by the driving mechanism.

The bore of the first column may contain a portion of the first nail adjacent an end of the nail for engaging with the driving mechanism with a remainder of the first nail protruding from the bore. The bore of the first column may form an interference fit with the portion of the first nail. The bore of the first column may be attached to the portion of the first nail. The bore of the first column may be formed with the portion of the first nail. With this arrangement, the remainder of the first nail protruding from the bore may, upon the application of force by the driving mechanism to the nail, fasten the fastener to the support structure.

The fastener may comprise a second nail formed entirely of one or more electrically non-conductive materials and partially contained within the second column of the body portion for positively engaging with the support structure upon the application of force by the driving mechanism thereby fastening the elongate object to the support structure.

The second column may comprise a bore which partially contains the second nail within the second column of the body portion. The bore may wholly extend through the second column. The bore may partially extend through the second column.

The bore of the second column may contain a portion of the second nail adjacent an end of the nail for engaging with the support structure. The bore of the second column may form an interference fit with the portion of the second nail. The bore of the second column may be attached to the portion of the second nail. The bore of the second column may have a diameter which facilitates movement of the second nail along the bore to allow the portion of the nail to protrude from the bore. The second nail may thus be displaceable relative to the body portion, from an out-of-use non-fastening configuration to an in-use fastening configuration, for fastening the fastener to the support structure upon the application of force by the driving mechanism.

The bore of the second column may contain a portion of the second nail adjacent an end of the nail for engaging with the driving mechanism with a remainder of the second nail protruding from the bore. The bore of the second column may form an interference fit with the portion of the second nail. The bore of the second column may be attached to the portion of the second nail. The bore of the second column may be formed with the portion of the second nail. With this arrangement, the remainder of the second nail protruding from the bore may, upon the application of force by the driving mechanism, fasten the fastener to the support structure.

The body portion may comprise first and second locating members for locating the body portion on the support structure. The first and second locating members may comprise free ends of the first and second columns. The locating members may each comprise a chamfered inner corner. These will reduce the possibility of the first and second columns nipping the elongate object which could result in damage to the elongate object.

The bridge and first and second columns may be integrally formed in a one-piece body portion.

The bridge may comprise a projection which projects into the receptacle for the elongate object. The projection may be substantially hemispherical in shape. The projection may be located at an approximate mid-point location along the bridge length. The projection may be located at an approximate mid-point location along the bridge width. The projection and the bridge may be integrally formed in a one-piece body portion. The projection may thus engage the elongate object at an approximate mid-point along the elongate object width. The projection may depress the elongate object at this mid-point due to an air gap in the elongate object provided beneath this mid-point.

The bridge may provide a cavity located along the bridge length on a side of the bridge opposite to the receptacle. The provision of a cavity reduces material used in the bridge. The provision of a cavity increases flexibility and strength of the bridge.

The body portion may comprise at least one strut connected between the bridge and the first column which projects into the receptacle for the elongate object. The body portion may comprise three struts connected between the bridge and the first column which project into the receptacle for the elongate object. The struts may be substantially parallel with each other. The struts may be connected to the bridge at substantially evenly-spaced locations along the bridge width. The struts may be connected to the bridge at an approximate mid-point location along the bridge width and first and second end-point locations along the bridge width. The or each strut may be integrally formed with the bridge and the first column in a one-piece body portion.

The body portion may comprise at least one strut connected between the bridge and the second column which projects into the receptacle for the elongate object. The body portion may comprise three struts connected between the bridge and the second column which project into the receptacle for the elongate object. The struts may be substantially parallel with each other. The struts may be connected to the bridge at substantially evenly-spaced locations along the bridge width. The struts may be connected to the bridge at an approximate mid-point location along the bridge width and first and second end-point locations along the bridge width. The or each strut may be integrally formed with the bridge and the second column in a one-piece body portion.

The strut or struts strengthen the body portion of the fastener. The strut or struts will grip the elongate object and reduce the possibility of the object being pulled lengthwise through the fastener. The provision of three struts will better grip the elongate object. This provides a fastener which is capable of resisting pulling and tugging by an operator on the elongate object without allowing the objects to slip through the fastener. When the elongate object is an electrical cable, the operator pulling and tugging occurs during the installation process of the cable to ensure the cable is flush and tight against the support structure.

The bridge may be deformable for adapting to the shape of the elongate object. The first and second columns may be deformable for adapting to the shape of the elongate object. This enables an operator to use the fastener with elongate objects of varying thickness, such as, but not limited, to a 1.5 mm twin core and earth electrical cable elongate object, a 1.5 mm three core and earth electrical cable elongate object, a 2.5 mm twin core and earth electrical cable elongate object, a coaxial cable elongate object, a category 5 signal cable elongate object, a plurality of cable elongate objects.

The body portion may be formed of a plastic polymer. The body portion may be formed of a thermoplastic material. The body portion may be formed of polyethylene. The body portion may be formed of high-density polyethylene. The body portion may be formed of polyvinyl chloride (PVC). The body portion may be formed of polypropylene. The body portion may be formed of a thermoset material.

The or each nail may comprise an elongate shaft. The elongate shaft may comprise a plurality of ridges. The ridges may be provided at four substantially equally-spaced locations around the shaft circumference. The ridges may be provided at three substantially equally-spaced locations around the shaft circumference. The ridges may assist in maintaining the or each nail in the support structure. The ridges may assist in substantial central positioning of a nail in the bore of a column. The elongate shaft may be outwardly flared at a first end to form a bulbous head. The bulbous head may have a substantially flat outer surface for contact with the driving mechanism. The bulbous head provides the driving mechanism with a larger surface area, such that an increased amount of force can be applied to the first nail. The elongate shaft may be tapered at a second end to form a point. The elongate shaft may be shaped at the second end to form one or more barbs.

The or each nail may be formed of one or more plastic polymer materials. The or each nail may be formed of one or more thermoplastic polymer materials. The or each nail may be formed of one or more glass-reinforced thermoplastic polymer materials. The or each nail may be formed of one or more glass-reinforced nylon materials. The or each nail may be formed of one or more polyarylamide materials. The or each nail may be formed of one or more thermoset materials.

The fastener may capable of withstanding up to 1000V.

According to a second aspect of the invention there is provided a strip of fasteners for loading into a driving mechanism comprising a plurality of fasteners according to the first aspect of the invention.

The strip of fasteners may be dimensioned to nest within a magazine of the driving mechanism. Adjacent fasteners in the strip of fasteners may be connected by one or more connecting webs. The one or more connecting webs may comprise a frangible or weakened material. The connecting webs help maintain the structural integrity of the strip of fasteners making it easier to load into the driving mechanism.

The driving mechanism may be a manual driving mechanism, such as a conventional hammer. The driving mechanism may be an automatic driving mechanism, such as a fastener gun.

The invention will now be described with reference to the accompanying drawings which shows, by way of example only, embodiments of a fastener in accordance with the first and second aspects of the invention.

Figure 1:
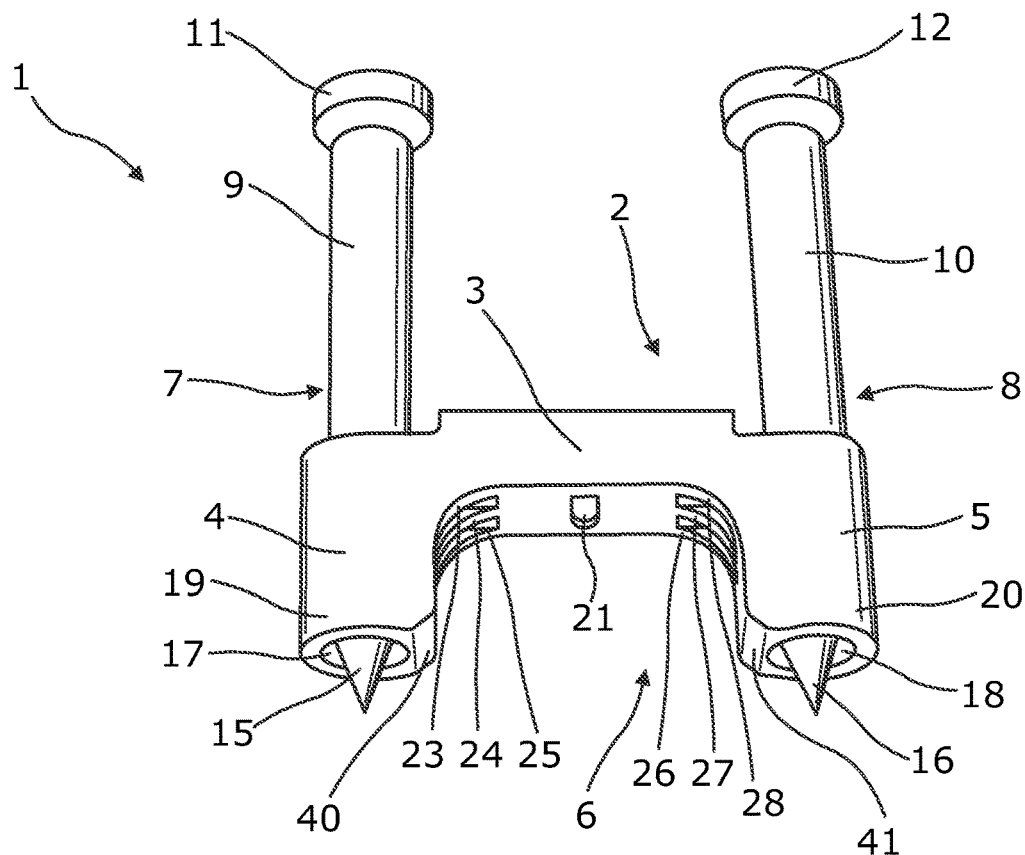
FIG. 1 is a perspective view of a first embodiment of a fastener in its out-of-use non-fastening configuration.
Figure 2:
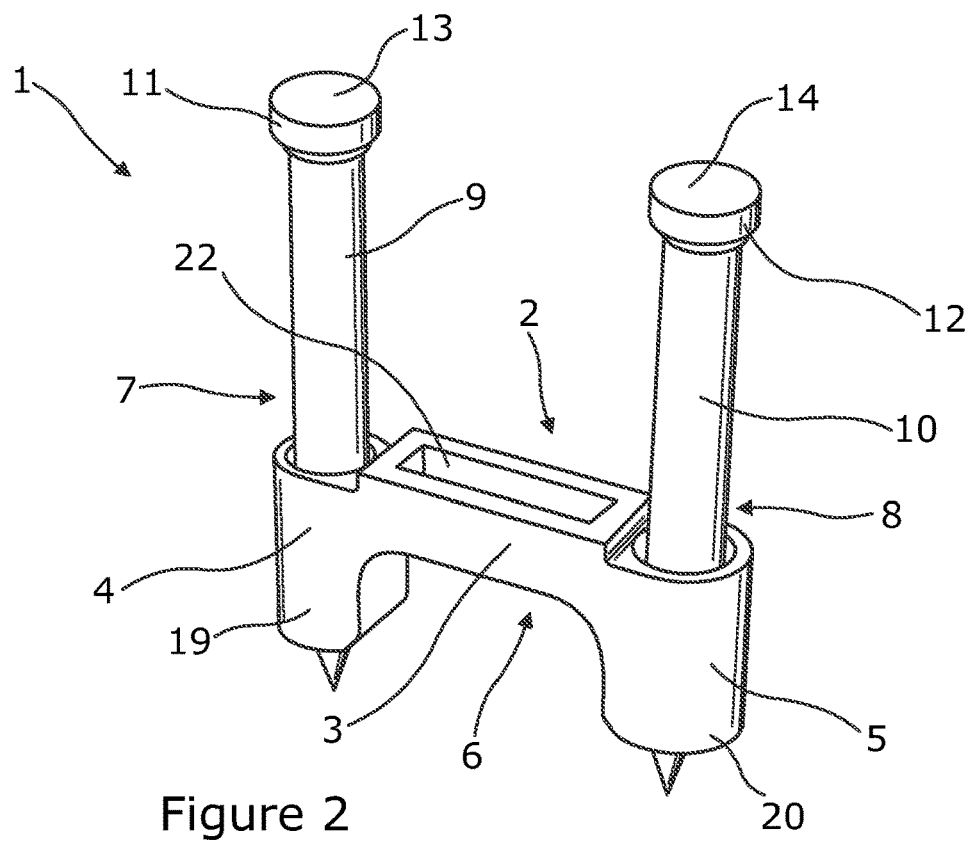
FIG. 2 is a second perspective view of the fastener of FIG. 1.

Referring to FIGS. 1 and 2, a first embodiment of a fastener 1, for fastening an elongate object (not shown) to a support structure (not shown), comprises a body portion 2 comprising a bridge 3, a first column 4 extending substantially perpendicularly from a first end of the bridge 3 and a second column 5 extending substantially perpendicularly from a second end of the bridge 3, the bridge 3 and columns 4, 5 together forming a U-shaped receptacle 6 for engaging the elongate object, a first nail 7 partially contained within the first column 4 of the body portion 2 and a second nail 8 partially contained within the second column 5 of the body portion 2, for positively engaging with the support structure upon the application of force by a driving mechanism (not shown) thereby fastening the elongate object to the support structure.

The nails 7, 8 each comprise an elongate shaft 9, 10. The elongate shafts 9, 10 are each outwardly flared at a first end to form a bulbous head 11, 12. The bulbous heads 11, 12 each have a substantially flat outer surface 13, 14 for contact with the driving mechanism. The bulbous heads 11, 12 provide the driving mechanism with a larger surface area, such that an increased amount of force can be applied to the nails 7, 8. The elongate shafts 9, 10 are each tapered at a second end to form pointed ends 15, 16.

The first column 4 comprises a bore 17, wholly extending through the first column 4, which partially contains the first nail 7 within the first column 4 of the body portion 2. In this embodiment, the bore 17 of the first column 4 contains a portion of the first nail 7 adjacent a pointed end of the nail 15 for engaging with the support structure. The bore 17 of the first column 4 has a diameter which facilitates movement of the first nail 7 along the bore 17 to allow the portion of the nail 7 to protrude from the bore 17. The first nail 7 may thus be displaceable relative to the body portion 2, from an out-of-use non-fastening configuration to an in-use fastening configuration, for fastening the fastener 1 to the support structure upon the application of force by the driving mechanism.

The second column 5 comprises a bore 18, wholly extending through the second column 5, which partially contains the second nail 8 within the second column 5 of the body portion 2. In this embodiment, the bore 18 of the second column 5 contains a portion of the second nail 8 adjacent a pointed end of the nail 16 for engaging with the support structure. The bore 18 of the second column 5 has a diameter which facilitates movement of the second nail 8 along the bore 18 to allow the portion of the nail 8 to protrude from the bore 18. The second nail 8 may thus be displaceable relative to the body portion 2, from an out-of-use non-fastening configuration to an in-use fastening configuration, for fastening the fastener 1 to the support structure upon the application of force by the driving mechanism.

The elongate shafts 9, 10 of the nails 7, 8 each comprise a plurality of ridges (not shown), provided at four substantially equally-spaced locations around the circumference of the shafts 9, 10. In this embodiment, the ridges assist in substantial central positioning of the first nail 7 in the bore 17 of the first column 4 and the second nail 8 in the bore 18 of the second column 5. The bores 17, 18 of the first and second columns 4, 5 will thus form an interference fit with the first and second nail 7, 8. The ridges also assist in maintaining the nails in their in-use fastening configuration in the support structure.

The body portion 2 comprises first and second locating members 19, 20, comprising free ends of the first and second columns 4, 5, for locating the body portion 2 on the support structure and either side of the elongate object. The locating members 19, 20 each comprise a chamfered inner corner 40, 41. These reduce the possibility of the first and second columns 4, 5 nipping the elongate object which could result in damage to the elongate object.

The bridge 3 comprises a projection 21 (FIG. 1) which projects into the receptacle 6 for the elongate object. The projection 21 is located at approximate mid-point locations along the length and width of the bridge 3. The projection 21 may thus engage the elongate object at an approximate mid-point along the elongate object width. When the elongate object is an electrical cable, the projection 21 depresses the elongate object at this mid-point due to an air gap in the elongate object provided beneath this mid-point.

The bridge 3 provides a cavity 22 (FIG. 2) located along the bridge length on a side of the bridge 3 opposite to the receptacle 6. The provision of the cavity 22 reduces material used in the bridge 3 and increases flexibility and strength of the bridge 3.

The body portion 2 of the fastener 1 comprises three struts 23, 24, 25 (FIG. 1) connected between the bridge 3 and the first column 4 which project into the receptacle 6 for the elongate object. The body portion 2 further comprises three struts 26, 27, 28 (FIG. 1) connected between the bridge 3 and the second column 5 which project into the receptacle 6 for the elongate object. The struts 23, 24, 25 are substantially parallel with each other. The struts 23, 24, 25 are connected to the bridge 3 at substantially evenly-spaced locations along the bridge width and are connected to the bridge 3 at an approximate mid-point location along the bridge width and first and second end-point locations along the bridge width. Similarly, the struts 26, 27, 28 are substantially parallel with each other. The struts 26, 27, 28 are connected to the bridge 3 at substantially evenly-spaced locations along the bridge width and are connected to the bridge 3 at an approximate mid-point location along the bridge width and first and second end-point locations along the bridge width.

The struts 23 to 28 strengthen the body portion 2 of the fastener 1. The struts 23 to 28 will grip the elongate object and reduce the possibility of the object being pulled lengthwise through the fastener 1. The provision of three struts connected between the bridge 3 and each column 4, 5 will better grip the elongate object.

The bridge 3 and the first and second columns 4, 5 are integrally formed in a one-piece body portion 2. Similarly, the projection 21 and the bridge 3 are integrally formed in the one-piece body portion 2 and the struts 23 to 28 are integrally formed with the bridge 3 and the first and second column 4, 5 in the one-piece body portion 2.

The bridge 3 and the first and second columns 4, 5 are deformable for adapting to the shape of the elongate object. This enables an operator to use the fastener 1 with elongate objects of varying thickness.

The body portion 2 of the fastener 1 is formed entirely of one or more electrically non-conductive materials, particularly high density polyethylene. The nails 7, 8 of the fastener 1 are formed entirely of one or more electrically non-conductive materials, particularly glass filled nylon. The fastener 1 is capable of withstanding 1000V.

Figure 3:
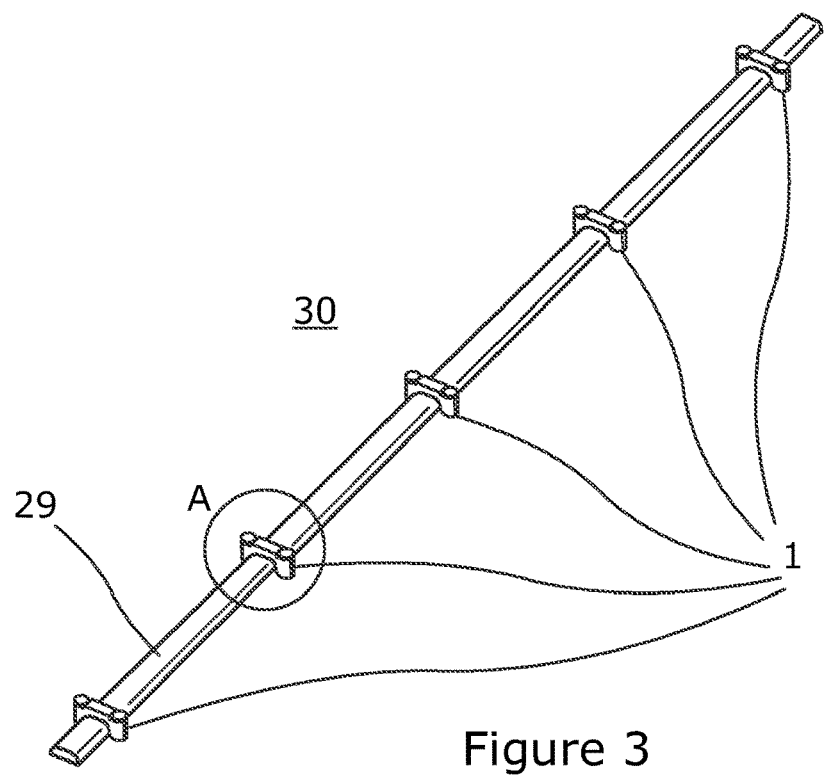
FIG. 3 is a perspective view of five of the fasteners of FIGS. 1 and 2 in their in-use fastening configuration fastened to a support structure.
Figure 4:
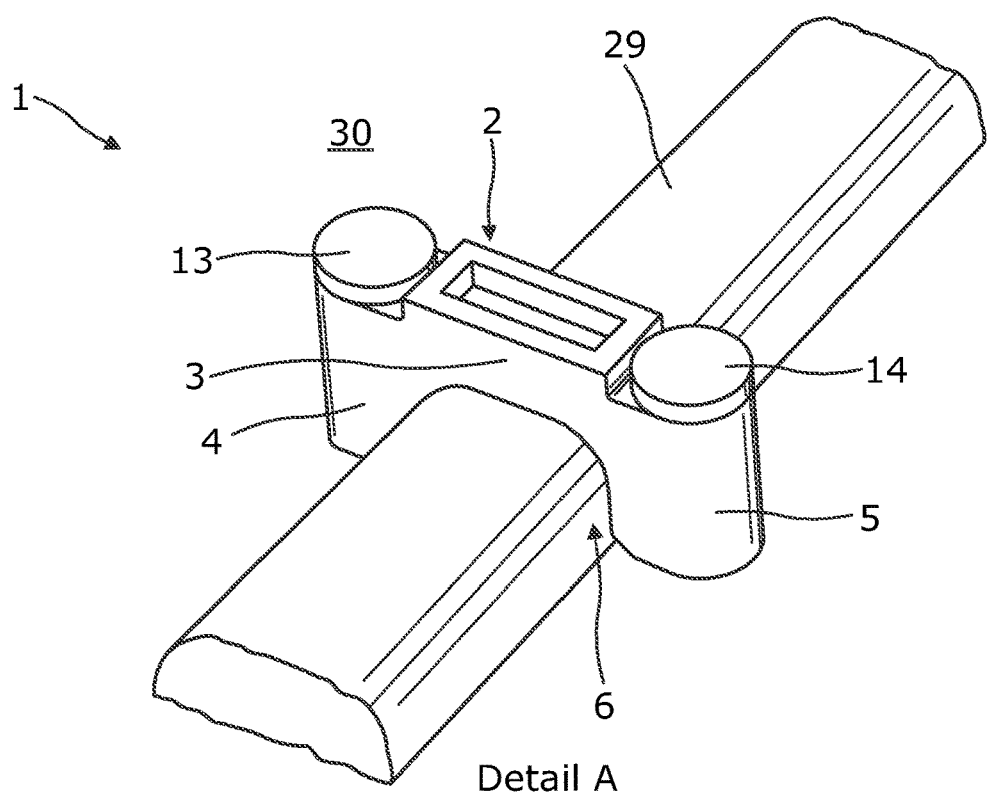
FIG. 4 is a detail view of one of the fasteners of FIG. 3.

Referring to FIGS. 3 and 4, five of the fasteners 1 of FIGS. 1 and 2 are shown, in their in-use fastening configuration, fastening an elongate object 29 to a support structure 30. The elongate object 29 may be an electrical cable and the support structure 30 may be a part of a house in which the electrical cable is being installed.

To use each of the fasteners 1, the body portion 2 is positioned transversely of the elongate object 29 so that the object is received in the receptacle 6 formed by the bridge 3 and the first and second columns 4, 5. The first and second locating members 19, 20, comprising free ends of the first and second columns 4, 5, are positioned against the support structure 30, for locating the body portion 2 on the support structure 30. In this position, the bores 17, 18 of the first and second columns 4, 5 contain a portion of the first and second nails 7, 8 adjacent pointed ends 15, 16 of the nails 7, 8 and the remainder of the nails 7, 8 protrude from the bores 17, 18 of the first and second columns 4, 5.

A driving mechanism (not shown), which may be a hammer or a fastener gun, is then used to apply a force to the surfaces 13, 14 of the bulbous heads 11, 12 of the nails 7, 8. The nails 7, 8 move along the bores 17, 18 of the first and second columns 4, 5 and the pointed ends 15, 16 of the nails 7, 8 penetrate a distance into the support structure 30. The first and second nails 7, 8 thus are displaceable relative to the body portion 2, from an out-of-use non-fastening configuration to an in-use fastening configuration, and the fastener 1 fastens the elongate object 29 to the support structure 30. In this position, the projection 21 of the bridge 3 projects into the receptacle 6 for the elongate object 29 and depresses the elongate object 29 at a mid-point along its width, due to an air gap in the elongate object 29 provided beneath this mid-point. The projection 21 thus grips the elongate object 29. Similarly, the struts 23 to 28 project into the receptacle 6 for the elongate object 29 and grip the elongate object 29 and reduce the possibility of the object 29 being pulled lengthwise through the fastener 1.

Figure 5:
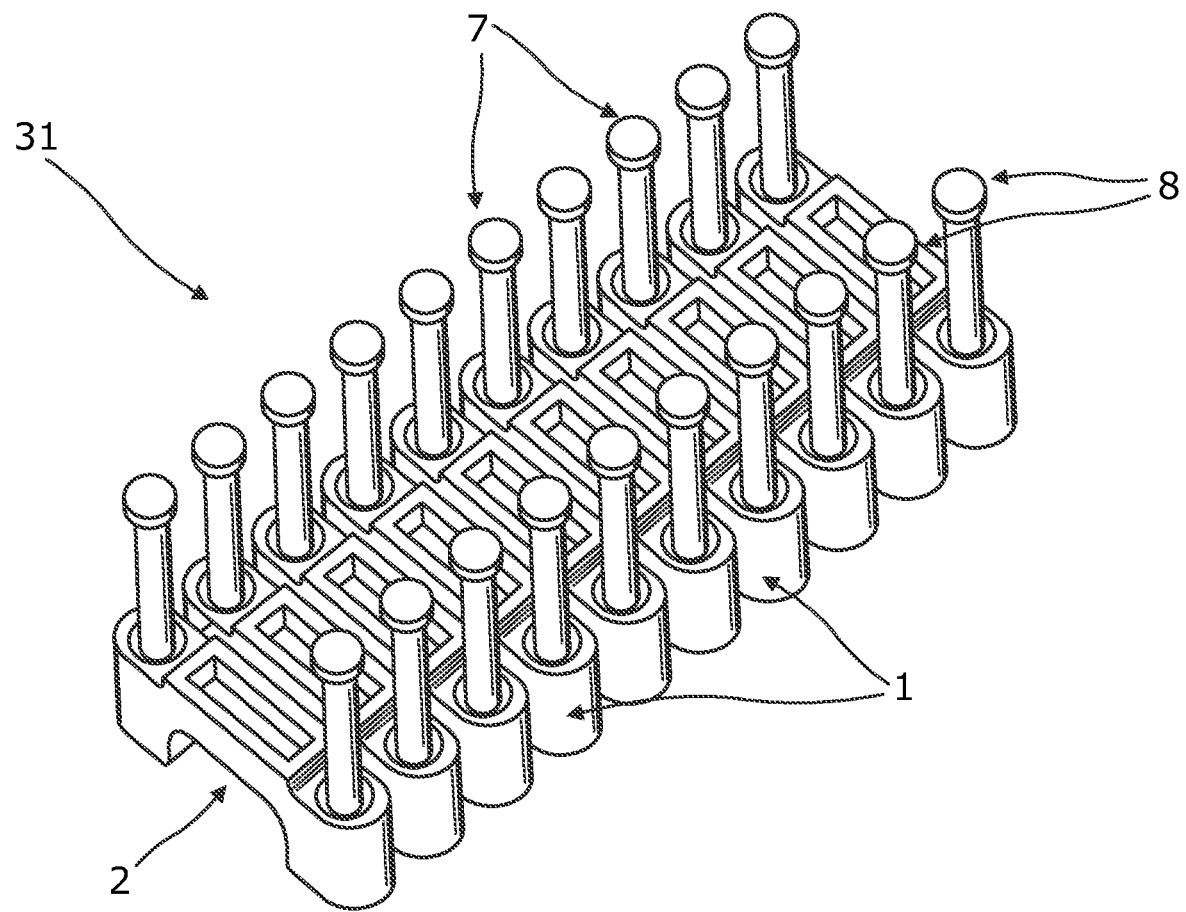
FIG. 5 is a perspective view of a strip of the fasteners of FIGS. 1 to 4 for nesting in a magazine of a fastener gun.
Figure 6:
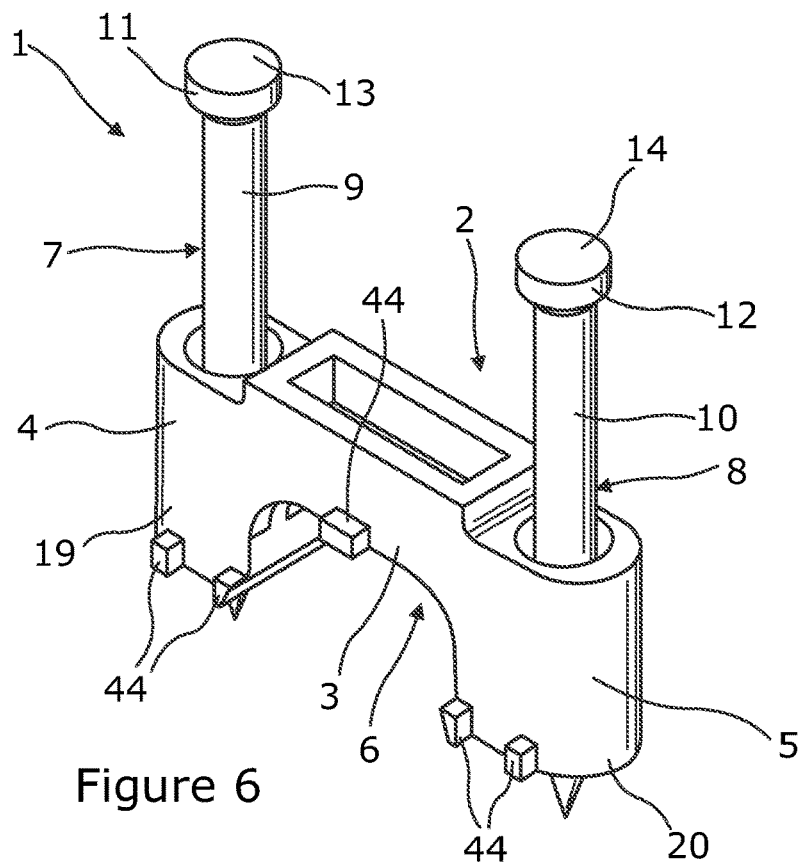
FIG. 6 is a perspective view of a fastener of the strip of FIG. 5.

Referring to FIG. 5, a plurality of fasteners 1 are provided in a predetermined number to make a strip 31 of fasteners 1. Preferably, twenty fasteners are provided in a strip. The dimensions of the strip 31 of fasteners 1 is designed to nest within the magazine of a fastener gun (not shown). Referring to FIG. 6, which shows one of the internal fasteners of the strip 31, connecting webs 44 are provided along mutually-opposing, adjacent sides of adjacent fasteners 1 within the strip 31. Several connecting webs 44 are provided in order to maintain the structural integrity of the strip 31 for placement in the magazine of a fastener gun.

Figure 7:
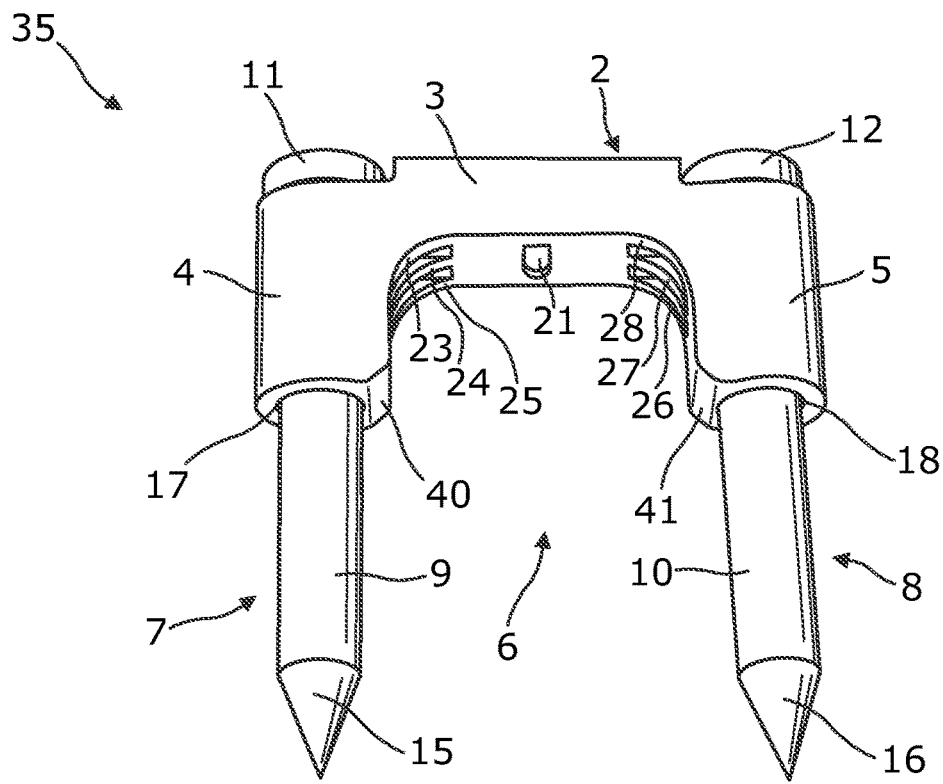
FIG. 7 is a perspective view of a second embodiment of a fastener.
Figure 8:
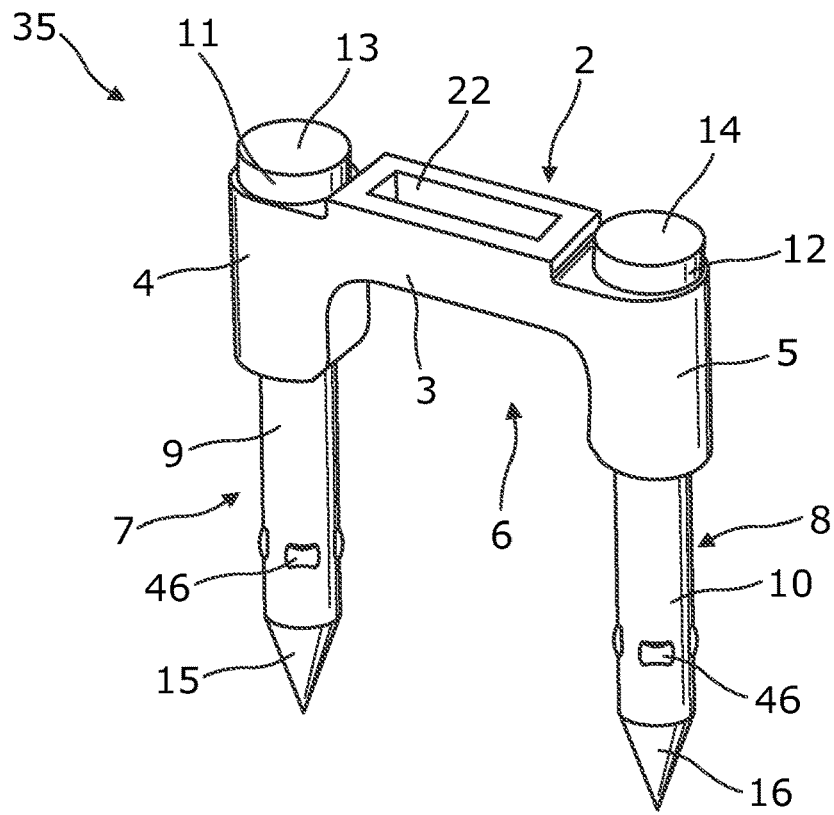
FIG. 8 is a second perspective view of the fastener of FIG. 7.

Referring to FIGS. 7 and 8, a second embodiment of a fastener 35 is shown, for fastening an elongate object (not shown) to a support structure (not shown). The fastener 35 is similar to the fastener 1 and like features have been denoted with like reference numerals.

In this embodiment, the bores 17, 18 of the first and second columns 4, 5 contain a portion of the first and second nails adjacent the heads 11, 12 of the nails 7, 8 i.e. adjacent ends of the nails 7,8 for engaging with a driving mechanism (not shown). The remainder of the first and second nails 7, 8 protrude from the bores 17, 18. The bores 17, 18 of the first and second columns 4, 5 are formed with the portions of the first and second nails 7, 8.

To use the fastener 35, the nails 7, 8, and thus the body portion 2, are positioned transversely of the elongate object. In this position, pointed ends 15, 16 of the nails 7, 8, which protrude from the bores 17, 18 of the first and second columns 4, 5, engage with the support structure. A driving mechanism (not shown), which may be a hammer or a fastener gun, is then used to apply a force to the surfaces 13, 14 of the heads 11, 12 of the nails 7, 8. The pointed ends 15, 16 of the nails 7, 8 penetrate a distance into the support structure 30, until the body part 2 engages the support structure. In this position, the elongate object is received in the receptacle 6 formed by the bridge 3 and the first and second columns 4, 5, and the fastener 35 fastens the elongate object to the support structure. As before, the projection 21 of the bridge 3 projects into the receptacle 6 for the elongate object and depresses the elongate object at a mid-point along its width, due to an air gap in the elongate object provided beneath this mid-point. The projection 21 thus grips the elongate object. Similarly, the struts 23 to 28 project into the receptacle 6 for the elongate object and grip the elongate object and reduce the possibility of the object being pulled lengthwise through the fastener 35.

In this embodiment, ridges 46 are provided at four substantially equally-spaced locations around the circumference of the shafts 9, 10 of the nails 7, 8. The ridges assist in maintaining the nails in their in-use fastening configuration in the support structure.

Figure 10:
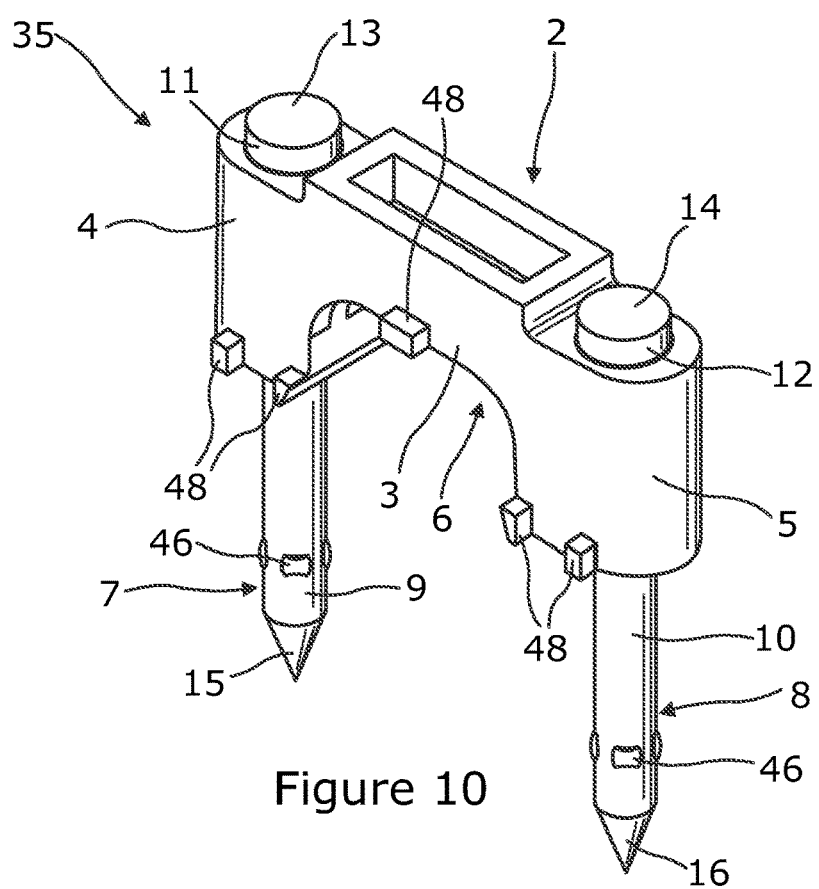
FIG. 10 is a perspective view of a fastener of the strip of FIG. 9.
Figure 9:
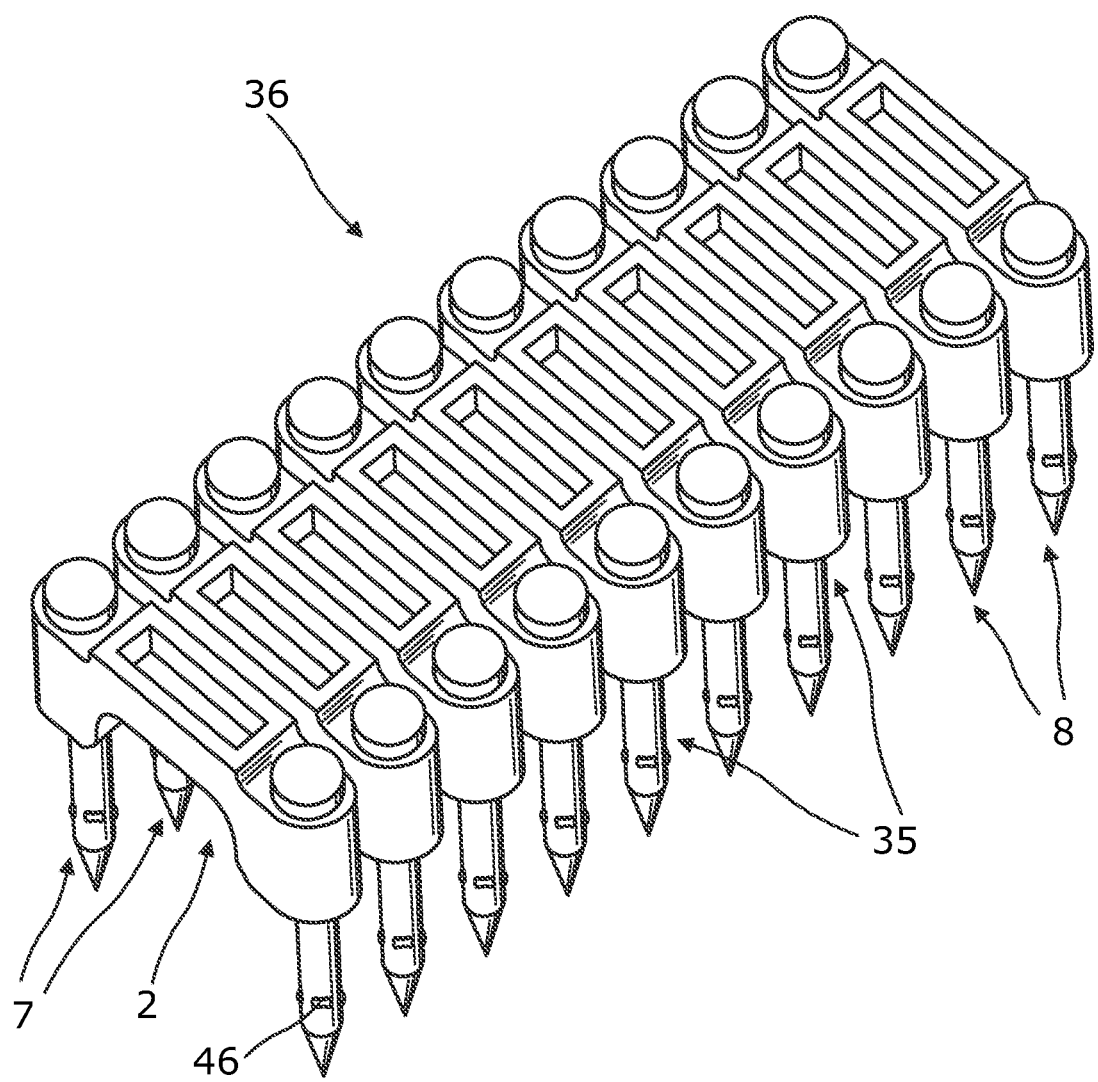
FIG. 9 is a perspective view of a strip of the fasteners of FIGS. 7 and 8.

Referring to FIG. 9, a plurality of fasteners 35 are provided in a predetermined number to make a strip 36 of fasteners 1. Preferably, twenty fasteners are provided in a strip. The dimensions of the strip 36 of fasteners 35 is designed to nest within the magazine of a fastener gun (not shown). Referring to FIG. 10, which shows one of the internal fasteners of the strip 36, connecting webs 48 are provided along mutually-opposing, adjacent sides of adjacent fasteners 35 within the strip 36. Several connecting webs 48 are provided in order to maintain the structural integrity of the strip 36 for placement in the magazine of a fastener gun.

As shown in the embodiments of the fastener described above, the fasteners contain two nails. It will be appreciated that a single nail embodiment is encompassed within the scope of the present invention.

As the embodiments of the fastener of the invention comprises no conductive, metallic parts, when it is used with, for example, electrical cables, there is a reduced risk of electrical current leakage or exposure.

The invention claimed is:

1. A fastener for fastening an elongate object to a support structure, the fastener comprising:
   a body portion formed entirely of one or more electrically non-conductive materials and comprising a bridge, a first column extending substantially perpendicularly from a first end of the bridge and a second column extending substantially perpendicularly from a second end of the bridge, the bridge and columns together forming a U-shaped receptacle for engaging the elongate object, and
   a nail formed entirely of one or more electrically non-conductive materials and partially contained within the first column of the body portion for positively engaging with the support structure upon the application of force by a driving mechanism thereby fastening the elongate object to the support structure.

2. A fastener according to claim 1 in which the first column comprises a bore which partially contains the first nail within the first column of the body portion, the bore of the first column contains a portion of the first nail adjacent an end of the nail for engaging with the support structure and the bore of the first column forms an interference fit with the portion of the first nail.

3. A fastener according to claim 1 comprising a second nail formed entirely of one or more electrically non-conductive materials and partially contained within the second column of the body portion for positively engaging with the support structure upon the application of force by the driving mechanism thereby fastening the elongate object to the support structure.

4. A fastener according to claim 3 in which the second column comprises a bore which partially contains the second nail within the second column of the body portion, the bore of the second column contains a portion of the second nail adjacent an end of the nail for engaging with the support structure and the bore of the second column forms an interference fit with the portion of the second nail.

5. A fastener according to claim 1 in which the bridge comprises a projection which projects into the receptacle for the elongate object.

6. A fastener according to claim 1 in which the body portion comprises at least one strut connected between the bridge and the first column and at least one strut connected between the bridge and the second column which struts project into the receptacle for the elongate object.

7. A fastener according to claim 1 in which the body portion is formed of a plastic polymer comprising a thermoplastic material.

8. A fastener according to claim 7 in which the body portion is formed of any of polyethylene, high density polyethylene.

9. A fastener according to claim 1 in which the or each nail comprises an elongate shaft which comprises a plurality of ridges.

10. A fastener according to claim 1 in which the or each nail is formed of one or more plastic polymer materials.

11. A fastener according to claim 10 in which the or each nail is formed of one or more thermoplastic polymer materials.

12. A fastener according to claim 11 in which the or each nail is formed of one or more glass-reinforced thermoplastic polymer materials.

13. A fastener according to claim 12 in which the or each nail is formed of one or more glass-reinforced nylon materials.

14. A fastener according to claim 1 in which the or each nail is formed of one or more thermoset materials.

15. A fastener according to claim 1 capable of withstanding up to 1000V.

16. A strip of fasteners for loading into a driving mechanism comprising a plurality of fasteners according to claim 1.

17. A fastener according to claim 1 in which the body portion is formed of a thermoplastic material.

18. A fastener for fastening an elongate object to a support structure, the fastener comprising:
    a body portion formed entirely of one or more electrically non-conductive materials and comprising a bridge, a first column extending substantially perpendicularly from a first end of the bridge and a second column extending substantially perpendicularly from a second end of the bridge, the bridge and columns together forming a U-shaped receptacle for engaging the elongate object, and
    two nails formed entirely of one or more electrically non-conductive reinforced polymer materials, each column of the body portion partially containing one of the nails for positively engaging with the support structure upon the application of force by a driving mechanism thereby fastening the elongate object to the support structure,
    wherein each column comprises a bore which partially contains the respective nail within the column of the body portion, the bore of the column contains a portion of the nail adjacent an end of the nail for engaging with the support structure and the bore of the column forms an interference fit with the portion of the nail.

19. The fastener of claim 18, wherein each nail is formed of one or more glass-reinforced nylon materials.

* * * * *